United States Patent
Chan et al.

(10) Patent No.: US 9,796,570 B2
(45) Date of Patent: Oct. 24, 2017

(54) LIFT ARRANGEMENT OF A LIFT TRUCK WITH MAST DAMPING DEVICES AND LIFT TRUCK

(71) Applicant: Jungheinrich Aktiengesellschaft, Hamburg (DE)

(72) Inventors: Kelvin Chan, Jersey Village, TX (US); John Recchia, Detroit, MI (US)

(73) Assignee: Jungheinrich Aktiengesellschaft, Hamburg (DE)

( * ) Notice: Subject to any disclaimer, the term of this patent is extended or adjusted under 35 U.S.C. 154(b) by 282 days.

(21) Appl. No.: 14/636,692

(22) Filed: Mar. 3, 2015

(65) Prior Publication Data

US 2016/0257541 A1    Sep. 8, 2016

(51) Int. Cl.
*B66F 9/08* (2006.01)
*B66F 9/07* (2006.01)
*F16F 3/087* (2006.01)

(52) U.S. Cl.
CPC .............. *B66F 9/08* (2013.01); *B66F 9/07* (2013.01); *F16F 3/0873* (2013.01)

(58) Field of Classification Search
CPC ............. B66F 9/08; B66F 9/07; F16F 3/0873
See application file for complete search history.

(56) References Cited

U.S. PATENT DOCUMENTS

| | | | | |
|---|---|---|---|---|
| 3,433,324 A | * | 3/1969 | McIntosh | B66F 9/08 187/222 |
| 3,506,092 A | * | 4/1970 | Nishi | B66F 9/08 187/226 |
| 3,647,099 A | * | 3/1972 | Carriere | B66F 9/065 414/607 |
| 3,768,595 A | * | 10/1973 | Kelley, Jr. | B66F 9/08 187/226 |
| 4,019,786 A | * | 4/1977 | Yarris | F16C 29/045 187/238 |
| 4,354,579 A | * | 10/1982 | Low | B66F 9/08 187/226 |
| 4,484,663 A | * | 11/1984 | Wyse | E06C 7/16 187/226 |
| 5,515,945 A | * | 5/1996 | Smith | B66F 9/08 187/226 |
| 5,690,315 A | * | 11/1997 | Thomas | B66F 3/24 187/272 |

(Continued)

FOREIGN PATENT DOCUMENTS

EP    1 512 662 B1    10/2007
JP    54-47268 A    4/1979

*Primary Examiner* — Michael Riegelman
(74) *Attorney, Agent, or Firm* — Walter Ottesen, P.A.

(57) ABSTRACT

A lift arrangement of a lift truck, especially a forklift truck, has a lift mast defining a z-axis. The lift mast includes a first mast section and a second mast section. Damping elements made from elastic material are provided on the first mast section and/or the second mast section preventing a hard impact of the second mast section with the first mast section at the run-in end position of the second mast section. The damping elements are configured and arranged in such a manner that, in addition to damping the movement of the second mast section in the direction of the z-axis, the damping elements damp movements of the second mast section in the directions of the x-axis and the y-axis running perpendicularly to the z-axis.

11 Claims, 4 Drawing Sheets

(56) References Cited

U.S. PATENT DOCUMENTS

| | | | | |
|---|---|---|---|---|
| 6,401,396 | B1* | 6/2002 | Koban | E05F 5/00 |
| | | | | 16/85 |
| 2015/0075913 | A1* | 3/2015 | Simpson | B66F 9/18 |
| | | | | 187/230 |
| 2015/0266708 | A1* | 9/2015 | Recchia | B66F 9/0755 |
| | | | | 187/226 |
| 2016/0039649 | A1* | 2/2016 | Goncalves | B66F 9/08 |
| | | | | 187/229 |
| 2016/0244309 | A1* | 8/2016 | Meloch | B66F 9/08 |
| 2017/0073203 | A1* | 3/2017 | Warner | B66F 9/22 |

\* cited by examiner

LIFT ARRANGEMENT OF A LIFT TRUCK WITH MAST DAMPING DEVICES AND LIFT TRUCK

FIELD OF THE INVENTION

The present invention relates to a lifting arrangement of a lift truck including a forklift truck. The lift truck has a lift mast defining an axis, a first mast section and a second mast section, which is guided axially in or on the first mast section and is movable in the axial direction relative thereto. Damping devices made from elastic material are provided on the first mast section and/or on the second mast section. The damping devices prevent a hard impact of the second mast section against the first mast section at the run-in end position of the second mast section. The damping devices also prevent a hard impact between the second mast section and a third mast section as well as between the third mast section and a fourth mast section.

BACKGROUND OF THE INVENTION

A lift arrangement of this type with corresponding damping devices is known. For example, EP 1 512 662 B1 describes a damping arrangement for the lift frame of an industrial truck, in which a damping element made from a stiff elastomer is arranged on a transverse connecting element of a mast section. The damping element is of elongate and flat shape. A transverse connecting element of another mast section strikes in the run-in end position thereof against the damping element which cushions the corresponding impact. A horizontal damper which counters corresponding vertical forces is involved here.

Such a horizontal damper damps vertical forces (in the z direction) which act on the corresponding mast section, but does not have any effect with respect to horizontal forces. Such horizontal forces are produced by the fact that one mast section moves within the tolerance range thereof in the horizontal direction relative to another mast section and, in the process, produces corresponding rattling noises. In order to reduce these rattling noises, use has been made of what are referred to as vertical dampers which dampen forces occurring in the horizontal direction between the mast sections (because of movements within the tolerance range) when the one mast section is completely run in relative to the other mast section. With such vertical dampers which are arranged, for example, on adjacent vertical surfaces of the mast sections moving relative to each other, forces occurring in the horizontal direction (y direction) are therefore damped.

However, forces which occur in the horizontal direction perpendicularly with respect to the direction indicated above, that is in the x direction, cannot be damped with the known vertical dampers. Forces in the horizontal direction can also damage vertical dampers because of shearing forces.

Horizontal dampers which damp vertically occurring forces, as described, for example, in EP 1 512 662 B1 mentioned above, are therefore firstly known in the prior art. Secondly, vertical dampers which damp forces occurring in a horizontal direction in one direction are known. However, damping devices which bring about damping in all three directions (in the z, y and x direction) are not known.

SUMMARY OF THE INVENTION

It is an object of the invention to provide a lift arrangement of the type described above wherein the damping devices have particularly good damping properties.

According to the invention, this object is achieved in a lift arrangement in that the damping devices are configured and arranged in such a manner that, in addition to damping the movement of the second mast section in the axial direction (along the z-axis), the damping devices damp movements of same in the two directions running perpendicularly to the z-axis (along the x-axis and the y-axis).

According to a feature of the invention, damping devices which bring about a damping effect in all three directions in space are therefore provided. In this way, not only are vertical forces which are exerted on the first mast section by the second mast section damped, but so too are horizontal forces which are exerted on the first mast section by the second mast section and arise, for example, when the second mast section moves in or on the guide of the first mast section within the tolerance range thereof. In this case, forces occurring both in the x direction and in the y direction are effectively damped.

This affords the advantage that various damping effects can be achieved with one damping device. Horizontal dampers and vertical dampers which are separated from one another therefore no longer have to be provided.

The damping devices are preferably formed by two damping elements on the first mast section, the damping elements making contact with the second mast section on both sides. In this embodiment, the second mast section is therefore guided within the first mast section and, in its end position, makes contact with the damping elements provided on the first mast section on both sides of the second mast section. The two damping elements therefore receive the lower end portion of the second mast section therebetween. The damping elements are preferably of wedge-shaped configuration here, thus resulting in a wedge effect which causes effective damping of the movement of the second mast section in the axial direction (z direction). Movements in both horizontal directions (x direction and y direction) are therefore damped simultaneously.

The damping elements are preferably arranged here on a step-shaped extension of the first mast section.

The embodiment described above does not exclude the damping elements also being able to be fixed on the second mast section, that is, on the lower end regions thereof, wherein a corresponding damping effect also occurs here when the second mast section strikes against the first mast section and takes up its end position.

In an embodiment of the invention, the second mast section and the damping elements have contact surfaces running parallel to each other. These are preferably oblique surfaces which bring about the wedge effect described above. The two lower corners of the second mast section are preferably also provided here with oblique surfaces of this type such that, in the end position of the second mast section, the oblique surfaces provided on the second mast section and the oblique surfaces provided on the damping elements bear against one another.

The contact surfaces provided on the damping elements do not necessarily have to be flat contact surfaces; instead, correspondingly curved contact surfaces which likewise damp movements of the second mast section in the z, x and y directions can also be provided.

So that damping is also possible in both horizontal directions, the contact surface, which is of flat or curved configuration, of the corresponding damping element is preferably arranged obliquely in space and forms an angle differing from 90° both with the x-axis and with the y-axis. In particular, each damping element has a base surface, a rear surface running perpendicularly with respect thereto and a contact surface for the second mast section, the contact surface forming an angle other than 90° with the base surface (xy plane) both in the x direction and in the y direction.

The damping elements are specifically fixed here by their base surface and rear surface on the first mast section. The base surface is fastened on a horizontally running surface of the first mast section while the rear surface is fixed on a vertically extending surface of the first mast section. If it is assumed here that the x-axis runs perpendicularly to the axis (z-axis) of the lift mast, the contact surface here then forms an angle differing from 90° both with the xz plane and with the yz plane, and therefore movements in both horizontal directions (x direction, y direction) are damped by contact with the damping elements.

For the damping devices, use may be made of customary elastic materials which firstly ensure a good damping effect, but secondly are sufficiently stable and robust (impact-resistant) so as not to be destroyed by the impacting mast section. Suitable materials for this are, for example, relatively stiff elastomers which are known to a person of ordinary skill in the art.

The present invention furthermore relates to a lift truck, especially a forklift truck, which is provided with a lifting arrangement which is configured in the manner described above.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
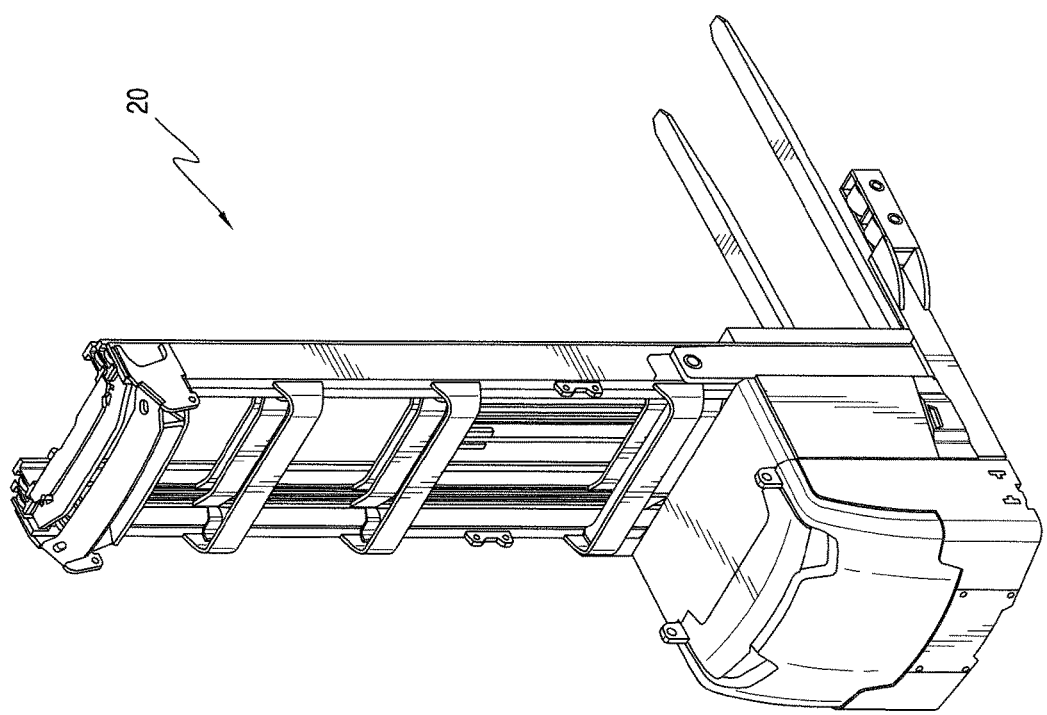
FIG. 1 is a perspective view of a forklift truck having a lift mast comprising three mast sections.

FIG. 1 shows a forklift truck 20 having a lift mast comprising three mast sections. The forklift truck 20 incorporates a damping assembly between the first and second mast sections. A damping assembly can also be provided between the second and third mast sections.

Figure 2:
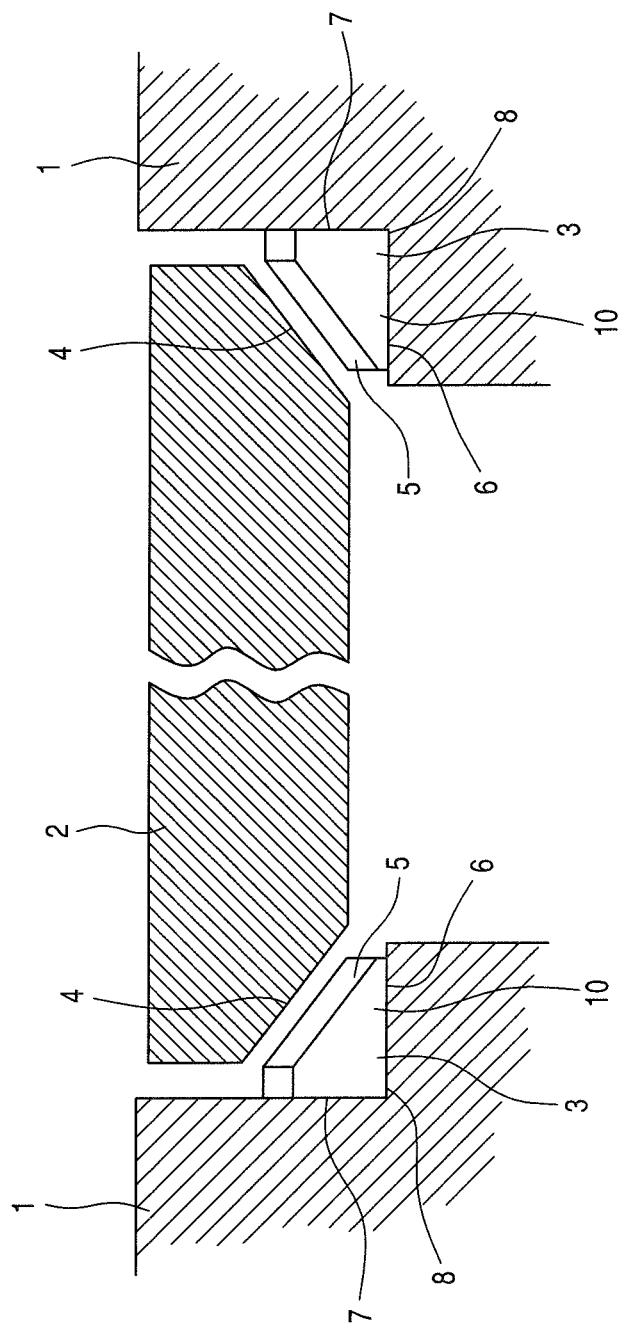
FIG. 2 shows a schematic vertical section through part of the lift mast depicting portions of a first mast section and a second mast section.

FIG. 2 schematically shows part of the lift mast of the forklift truck 20 shown in FIG. 1. Here, the second mast section 2 is arranged moveably in the first mast section 1 and is guided therein. The second mast section 2 is shown in a position shortly before it is run into the lower end position thereof. In its lower end position, the second mast section 2 impacts against damping devices which are formed by two wedge-shaped damping elements 3. The two damping elements are configured and arranged in a mirror-inverted manner with respect to each other. The two damping elements 3 are arranged on a step-shaped section 8 of the first mast section and are fixed thereon via bolts (not shown), wherein a base surface 6 of the damping element 3 is mounted on a horizontally running section, and a rear surface 7 of the damping element 3 is arranged on a vertically running section of the step-shaped extension of the first, stationary mast section 1.

Each damping element 3 is of approximately wedge-shaped configuration, and, in addition to its base surface 6 and the rear surface 7 running perpendicularly with respect thereto, has an obliquely running contact surface 5. The latter is arranged both obliquely with respect to the base surface 6 and obliquely with respect to the rear surface 7 and therefore does not form a right angle with the front end 10 of the damping element.

As indicated in FIG. 2, the two lower corners of the second, moveable mast section 2 are beveled and have obliquely running contact surfaces 4 which run parallel to the contact surface 5 of the respective damping elements. In the lower end position of the second mast section 2, the surfaces 4 therefore bear against the contact surfaces 5 of the damping elements 3.

Figure 3A:
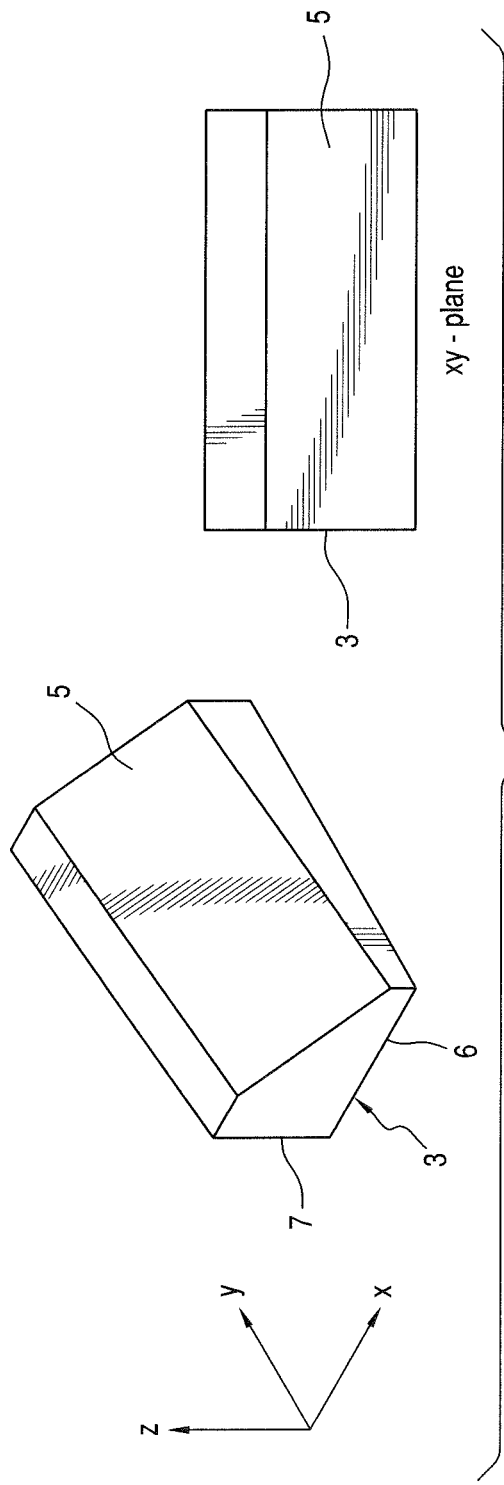
FIGS. 3A and 3B show a first embodiment of a damping element in a three-dimensional view and in two side views and in a top view; and, FIGS. 4A and 4B show a further embodiment of a damping element in a three-dimensional view and in two side views and in a top view.
Figure 3B:
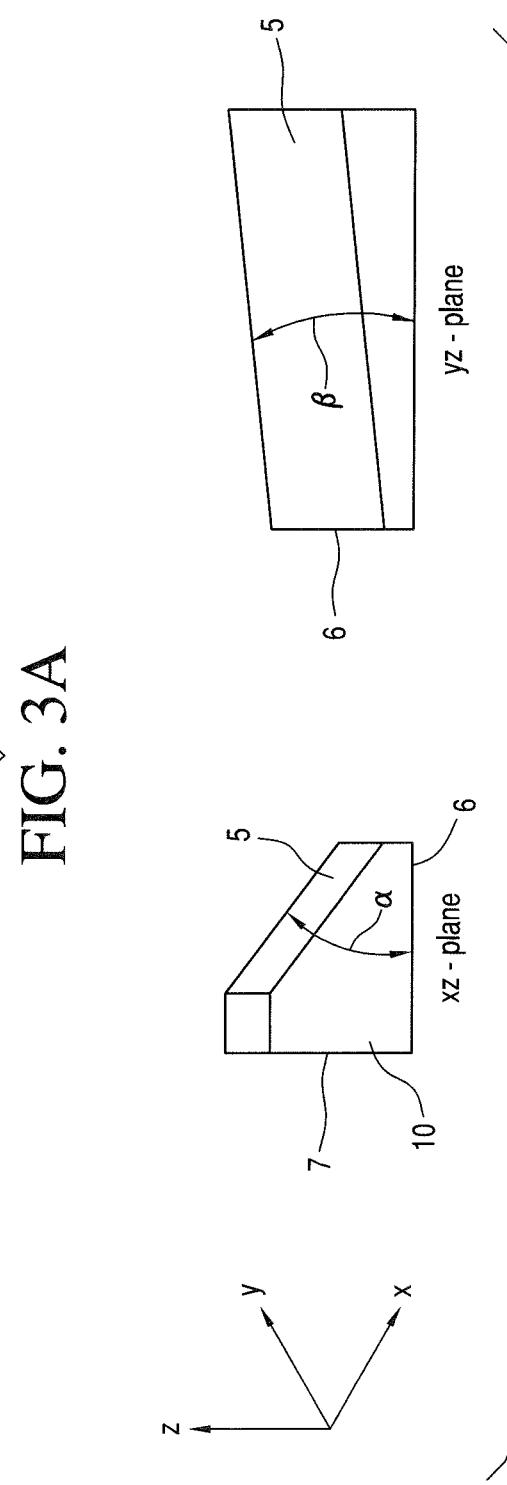

FIG. 3A shows the damping element 3 of FIG. 2 in a perspective view, in a top view and in a plan view and FIG. 3B shows the damping element 3 in two side elevation views. If a coordinate system, which is indicated in FIGS. 3A and 3B, is taken here as a basis, the corresponding views are produced in the respective planes. It can be seen here that the contact surface 5 forms an angle differing from 90° both with the xz plane and with the yz plane. The corresponding angles are identified by $\alpha$ and $\beta$. In this case, the base surface 6 corresponds to the xy plane while the rear surface 7 corresponds to the yz plane. The xz plane forms the front side 10.

Figure 4A:
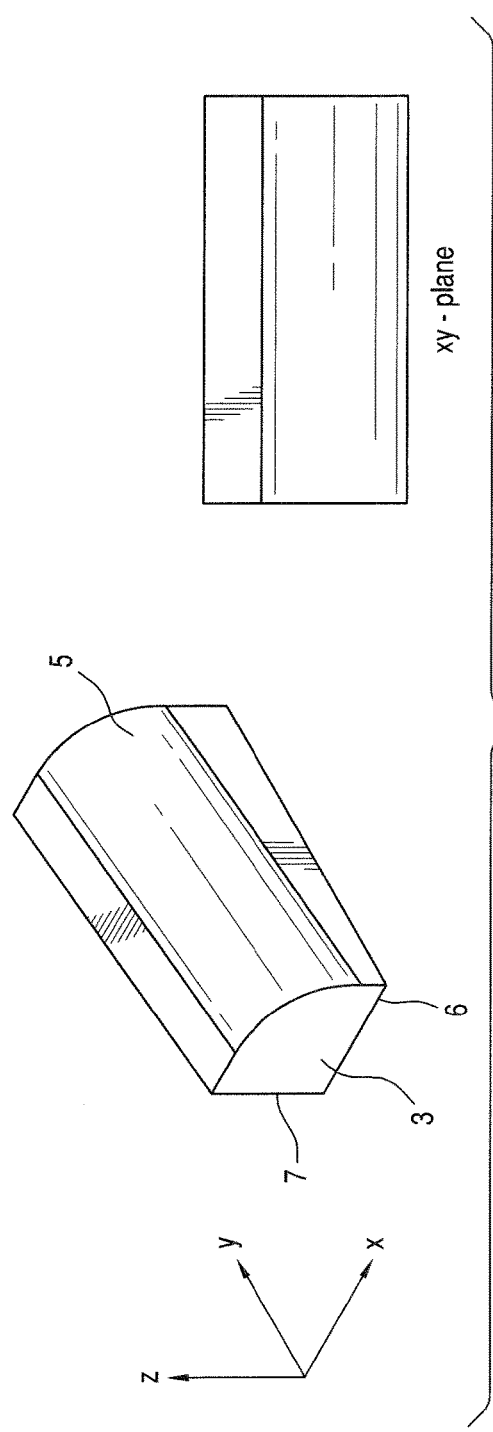
Figure 4B:
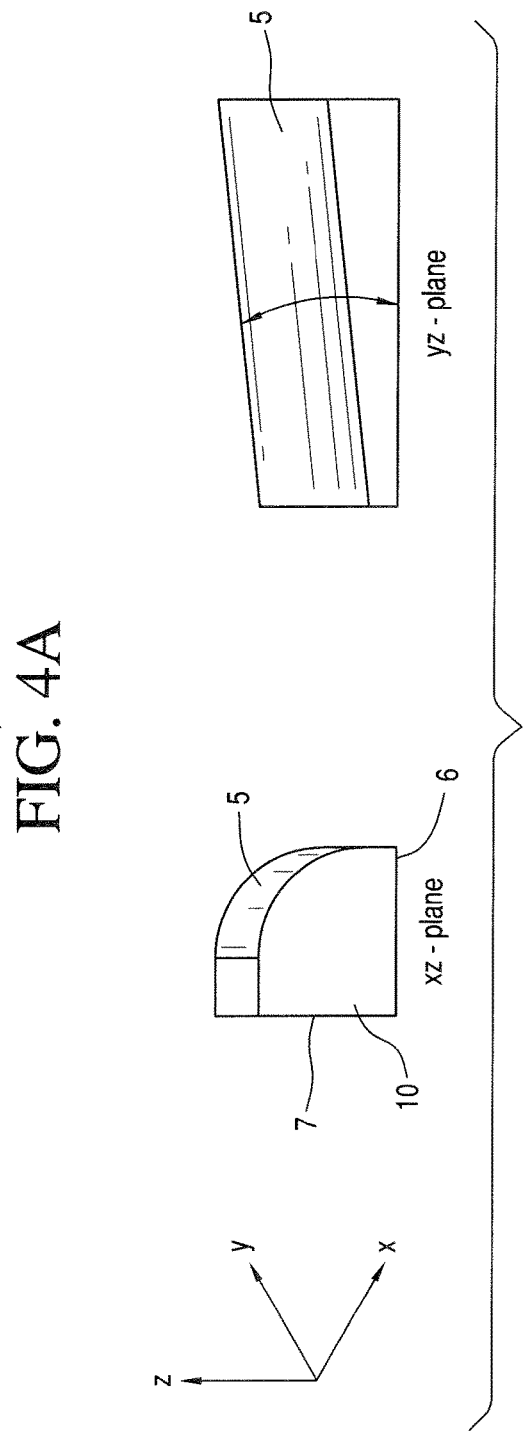

FIGS. 4A and 4B show a further embodiment of a damping element 3. This embodiment differs from that of FIGS. 3A and 3B only in that the contact surface 5 here is not of flat, but rather of curved configuration. A dome-shaped structure therefore results.

If, during the operation of the lifting arrangement, the second mast section 2 is lowered into its lower end position, the two contact surfaces 4 of the second mast section enter into engagement with the corresponding contact surfaces 5 of the two damping elements 3. The impact of the second mast section against the first mast section is thereby damped. The contact surfaces 4, 5 entering into engagement with each other stop the movement of the second mast section in the axial direction of the lifting arrangement (z direction) and at the same time prevent a movement in both horizontal directions (in the x direction and y direction) since the contact surfaces forming both the angle $\alpha$ and the angle $\beta$ prevent a horizontal movement parallel to the plane of image of FIG. 2 and perpendicularly thereto.

It is understood that the foregoing description is that of the preferred embodiments of the invention and that various changes and modifications may be made thereto without departing from the spirit and scope of the invention as defined in the appended claims.

What is claimed is:

1. A lift arrangement of a lift truck, the lift arrangement comprising:
   a lift mast defining an imaginary x-y-z coordinate system and having a first mast section and a second mast section movable relative to said first mast section along the z-axis of said coordinate system;
   said lift mast further defining a run-in end position of said second mast section;
   said first and second mast sections conjointly defining an interface at said run-in end position;
   a damping assembly made of elastic material provided at at least one of said first mast section and said second mast section and configured to prevent a hard impact between said first mast section and said second mast section at said run-in end position of said second mast section by dampening the movement of said second mast section along said z-axis; and, said damping assembly including damping units made of said elastic material and being configured and mounted at said interface so as to also dampen movements of said second mast section along both the x-axis and the y-axis of said coordinate system running perpendicularly to said z-axis;

said second mast section having a first side and a second side;

said damping units being formed by a first damping element configured to contact said first side of said second mast section and a second damping element configured to contact said second side of said second mast section;

said first and said second damping elements have respective planar contact surfaces; and, said contact surfaces are configured to dampen movements of said second mast section in the directions of the x-axis, y-axis and z-axis of said imaginary x-y-z coordinate system.

2. The lift arrangement of claim 1, wherein said damping elements are wedge-shaped.

3. The lift arrangement of claim 1, wherein:
said first mast section has a first and a second step-shaped extension;
said first damping element is arranged on said first step-shaped extension; and,
said second damping element is arranged on said second step-shaped extension.

4. The lift arrangement of claim 1, wherein said second mast section and said damping elements each have respective contact surfaces running parallel to each other.

5. The lift arrangement of claim 1, wherein:
said first and said second damping elements each have a base surface, a rear surface running perpendicular to said base surface thereof and said contact surface for said second mast section; and,
the contact surface of each of said damping elements defines an angle with the base surface (xy plane) thereof which departs from 90 degrees in the direction of the x-axis as well as in the direction of the y-axis.

6. The lift arrangement of claim 5, wherein each of said first and second damping elements is fixed on said first mast section via the base surface and rear surface thereof.

7. A lift arrangement of a lift truck, the lift arrangement comprising:
a lift mast defining an imaginary x-y-z coordinate system and having a first mast section and a second mast section movable relative to said first mast section along the z-axis of said coordinate system;
said lift mast further defining a run-in end position of said second mast section;
said first and second mast sections conjointly defining an interface at said run-in end position;
a damping assembly made of elastic material provided at at least one of said first mast section and said second mast section and configured to prevent a hard impact between said first mast section and said second mast section at said run-in end position of said second mast section by dampening the movement of said second mast section along said z-axis;

said damping assembly including damping units made of said elastic material and being configured and mounted at said interface so as to also dampen movements of said second mast section along both the x-axis and the y-axis of said coordinate system running perpendicularly to said z-axis;

said second mast section having a first side and a second side;

said damping units being formed by a first damping element configured to contact said first side of said second mast section and a second damping element configured to contact said second side of said second mast section;

said damping elements being wedge-shaped;

said second mast section and said damping elements each having respective contact surfaces running parallel to each other;

said first and said second damping elements having respective planar contact surfaces; and, said contact surfaces being configured to dampen movements of said second mast section in the directions of the x-axis, y-axis and z-axis of said imaginary x-y-z coordinate system.

8. The lift arrangement of claim 7, wherein:
said first mast section has a first and a second step-shaped extension;
said first damping element is arranged on said first step-shaped extension; and,
said second damping element is arranged on said second step-shaped extension.

9. The lift arrangement of claim 7, wherein:
said first and said second damping elements each have a base surface, a rear surface running perpendicular to said base surface thereof and said contact surface for said second mast section; and,
the contact surface of each of said damping elements defines an angle with the base surface (xy plane) thereof which departs from 90 degrees in the direction of the x-axis as well as in the direction of the y-axis.

10. The lift arrangement of claim 9, wherein each of said first and second damping elements is fixed on said first mast section via the base surface and rear surface thereof.

11. The lift arrangement of claim 7, wherein said lift truck is a forklift truck.

* * * * *